(12) United States Patent
Li et al.

(10) Patent No.: US 12,119,745 B2
(45) Date of Patent: Oct. 15, 2024

(54) SHORT-CIRCUIT PROTECTION CIRCUIT, CHIP AND SYSTEM FOR SWITCHED-MODE POWER SUPPLY

(71) Applicant: SHANGHAI XINLONG SEMICONDUCTOR TECHNOLOGY CO., LTD., Shanghai (CN)

(72) Inventors: Ruiping Li, Shanghai (CN); Jinlong Xu, Shanghai (CN); Bin Liu, Shanghai (CN); Wei Chi, Shanghai (CN)

(73) Assignee: SHANGHAI XINLONG SEMICONDUCTOR TECHNOLOGY CO., LTD., Shanghai (CN)

( * ) Notice: Subject to any disclaimer, the term of this patent is extended or adjusted under 35 U.S.C. 154(b) by 224 days.

(21) Appl. No.: 17/802,712

(22) PCT Filed: Jul. 14, 2021

(86) PCT No.: PCT/CN2021/106354
§ 371 (c)(1),
(2) Date: Aug. 26, 2022

(87) PCT Pub. No.: WO2022/012603
PCT Pub. Date: Jan. 20, 2022

(65) Prior Publication Data
US 2023/0127616 A1 Apr. 27, 2023

(30) Foreign Application Priority Data

Feb. 5, 2021 (CN) .......................... 202110157438.0

(51) Int. Cl.
*H02M 3/158* (2006.01)
*H02M 1/00* (2006.01)

(52) U.S. Cl.
CPC ......... *H02M 3/158* (2013.01); *H02M 1/0022* (2021.05); *H02M 1/0045* (2021.05)

(58) Field of Classification Search
CPC ... H02M 3/158; H02M 1/0022; H02M 1/0045
See application file for complete search history.

(56) References Cited

U.S. PATENT DOCUMENTS 6,548,992 B1  4/2003 Alcantar et al.
8,064,231 B2 * 11/2011 Fang ................. H02M 3/33507
                                              363/21.18

(Continued)

FOREIGN PATENT DOCUMENTS

CN       101150255 A      3/2008
CN       201435598 Y      3/2010

(Continued)

OTHER PUBLICATIONS

International Search Report, China National Intellectual Property Administration, Application No. PCT/CN2021/106354, mailed Nov. 4, 2021, 4 pages.

*Primary Examiner* — Adolf D Berhane
(74) *Attorney, Agent, or Firm* — Ziegler IP Law Group LLC.

(57) ABSTRACT

A short-circuit protection circuit, chip and system for a switched-mode power supply are disclosed. The short-circuit protection circuit includes: a sampling module for sampling an input voltage and producing a first voltage from the input voltage; a generation module for generating a second voltage from a reference voltage; a comparison module for comparing the first voltage and the second voltage; and an output module for producing, from a result of the comparison performed by the comparison module, and outputting a control signal for controlling an external power transistor in the event of a short circuit in the switched-mode power supply. According to the present (Continued)

invention, when an output short circuit is detected, a hiccup-mode duty cycle is adjusted according to the input voltage, thus avoiding great energy loss when the input voltage is high and enabling loaded startup or automatic output recovery after the short circuit condition is removed when the input voltage is low.

12 Claims, 9 Drawing Sheets

(56) References Cited

U.S. PATENT DOCUMENTS

| | | | |
|---|---|---|---|
| 11,735,901 B2* | 8/2023 | Zhou | H02H 3/066 361/97 |
| 2022/0263403 A1* | 8/2022 | Li | H02M 3/156 |

FOREIGN PATENT DOCUMENTS

| | | |
|---|---|---|
| CN | 105515360 A | 4/2016 |
| CN | 206908273 U | 1/2018 |
| CN | 108321762 A | 7/2018 |
| CN | 210111581 U | 2/2020 |
| CN | 112510983 A | 3/2021 |

* cited by examiner

Time (s)

SHORT-CIRCUIT PROTECTION CIRCUIT, CHIP AND SYSTEM FOR SWITCHED-MODE POWER SUPPLY

TECHNICAL FIELD

The present invention relates to the field of power supply chips, and more particularly to a short-circuit protection circuit, chip and system for a switched-mode power supply.

BACKGROUND

When detecting the occurrence of an output short circuit, a switched-mode power supply (SMPS) system will take a countermeasure to protect itself from possible damage that may be caused by the fault. Such short-circuit protection can be achieved in various ways, usually by, for example, limiting or interrupting the output current, or initiating a hiccup mode.

The current limiting approach involves limiting the output current upon detecting an output short circuit so that the power supply system operates as if it is in a constant-current mode that is capable of providing protection to the system. However, in order to ensure that the system can normally start up or recover from the short-circuit event, or for other reasons, the output current is often limited to a high value, leading to high energy loss during the short circuit condition and imposing strict requirements on peripheral devices.

The current interrupting approach involves directly shutting off the output current upon detecting an output short circuit. However, when the power supply system starts up again, it may determine that it is still under a short circuit condition due to a low output voltage. Therefore, this approach often strictly requires the system, after it starts up, to provide an output before it is loaded. This dramatically limits the application of the method.

The hiccup-mode short-circuit protection approach is a tradeoff between the above two approaches. In this approach, when the system sees an output short circuit event, a hiccup mode is initiated, where the system continues operating for a period of time and then shuts down. In this way, not only loss can be reduced to a very low level, but lightly loaded startup is also allowed.

However, in conventional hiccup-mode short-circuit protection circuits, a hiccup-mode duty cycle, which is defined as the ratio of the duration of an output period (active period) within a hiccup cycle to the total duration of the previous hiccup cycle, is maintained constant, i.e., does not vary with the input voltage. As a result, if the input voltage is high, much energy will be delivered to an output terminal of the SMPS system during an active period; and if the input voltage is low, lesser energy will be delivered to the output terminal. This is problematic because, depending on how low the input voltage is, loaded startup may be unsuccessful due to insufficient energy. Another problem is that, when the input voltage is high, due to a constant hiccup-mode duty cycle, despite successful short-circuit protection, significant loss will occur during the short circuit condition, which not only leads to a waste of energy, but also threatens the stability of the power supply system.

SUMMARY OF THE INVENTION

It is an objective of the present invention to provide a short-circuit protection circuit, chip and system for a switched-mode power supply. According to the present invention, when an output short circuit event is detected, a hiccup-mode duty cycle is adjusted according to an input voltage, thus preventing significant energy loss when the input voltage is high. Moreover, when the input voltage is low, loaded startup or automatic output recovery after the short circuit condition is removed is allowed.

In embodiments of the present invention, there is provided a short-circuit protection circuit for a switched-mode power supply. The short-circuit protection circuit includes a sampling module for sampling an input voltage and producing a first voltage from the input voltage; a generation module for generating a second voltage from a reference voltage, the second voltage having a predetermined period and a sawtooth waveform; a comparison module for comparing the first voltage and the second voltage; and an output module for producing, from a result of the comparison performed by the comparison module, and outputting a control signal for controlling an external power transistor in the event of a short circuit in the switched-mode power supply, wherein: if the result of the comparison is a first comparison result indicating that the first voltage is higher than the second voltage during a first time interval within the predetermined period, then the output module produces, from the first comparison result, and outputs a first control signal for causing the external power transistor to be out of operation within the first time interval; if the result of the comparison is a second comparison result indicating that the first voltage is lower than the second voltage during a second time interval within the predetermined period, then the output module produces, from the second comparison result, and outputs a second control signal for causing the external power transistor to operate within the second time interval, wherein the predetermined period consists of the first time interval and the second time interval; and the second time interval decreases with increase of the first voltage. The sum of the first and second time intervals is constant (equal to the predetermined period). The second time interval decreases with increase of the first voltage, and a hiccup-mode duty cycle decreases with increase of the first voltage and increases with decrease of the first voltage.

Additionally, the first voltage may vary linearly with the input voltage.

Additionally, the short-circuit protection circuit may further include a detection module connected to the output module, the detection module configured to detect whether there is a short circuit in the switched-mode power supply, wherein in the event the occurrence of a short circuit, the detection module outputs a low-level signal, and if there is no short circuit, it outputs a high-level signal.

Additionally, when the first voltage is higher than the second voltage, the comparison module may output a low-level signal, wherein when the first voltage is lower than the second voltage, the comparison module outputs a high-level signal.

Additionally, when the comparison module outputs a low-level signal and the detection module also outputs a low-level signal, the output module may output a high-level signal for causing the external power transistor to be out of operation, wherein when the comparison module outputs a high-level signal and the detection module outputs a low-level signal, the output module outputs a low-level signal for causing the external power transistor to operate.

Additionally, the sampling module may include a first resistor, a second resistor, a third resistor, a fourth resistor, a fifth resistor, a sixth resistor and a first operational amplifier, the second resistor receiving the input voltage at one end, the second resistor connected at the other end to one end of the first resistor, the other end of the first resistor grounded, the fourth resistor connected at one end to both the second resistor and the first resistor, the fourth resistor connected at the other end to both one end of the third resistor and a first input terminal of the first operational amplifier, third resistor receiving the reference voltage at the other end, the first operational amplifier having a second input terminal connected to both one end of the fifth resistor and one end of the sixth resistor, the fifth resistor grounded at the other end, the sixth resistor connected at the other end to an output terminal of the first operational amplifier, the output terminal of the first operational amplifier outputting the first voltage.

Additionally, the generation module may include a current source, a capacitor, a field-effect transistor, a seventh resistor, an eighth resistor and a second operational amplifier, the current source connected at one end to a power supply voltage, the current source connected at the other end to both one end of the capacitor and a drain of the field-effect transistor, the capacitor grounded at the other end, the second operational amplifier having a first input terminal connected to the drain of the field-effect transistor, the second operational amplifier having a second input terminal connected to both one end of the seventh resistor and one end of the eighth resistor, the second operational amplifier having a first input terminal receiving the second voltage, the seventh resistor receiving the reference voltage at the other end, the eighth resistor connected at the other end to both an output terminal of the second operational amplifier and a gate of the field-effect transistor, the field-effect transistor having a grounded source.

Additionally, the output module may include a first inverter, a second inverter, and an AND gate, the first inverter having an output terminal connected to a first input terminal of the AND gate, the second inverter having an output terminal connected to a second input terminal of the AND gate, the AND gate having an output terminal from which the control signal is output to the external power transistor.

In embodiments of the present invention, there is also provided a short-circuit protection method for a switched-mode power supply. The method includes: sampling an input voltage and producing a first voltage from the input voltage; generating a second voltage from a reference voltage, the second voltage having a predetermined period and a sawtooth waveform; comparing the first voltage and the second voltage; and producing, from a result of the comparison of the first voltage and the second voltage, and outputting a control signal for controlling an external power transistor in the event of a short circuit in the switched-mode power supply, wherein: if the result of the comparison is a first comparison result indicating that the first voltage is higher than the second voltage during a first time interval within the predetermined period, then the output module produces, from the first comparison result, and outputs a first control signal for causing the external power transistor to be out of operation within the first time interval; if the result of the comparison is a second comparison result indicating that the first voltage is lower than the second voltage during a second time interval within the predetermined period, then the output module produces, from the second comparison result, and outputs a second control signal for causing the external power transistor to operate within the second time interval, wherein the predetermined period consists of the first time interval and the second time interval; and the second time interval decreases with increase of the first voltage.

In embodiments of the present invention, there is also provided a switched-mode power supply chip including the short-circuit protection circuit as defined in any of the foregoing embodiments of the present invention.

Additionally, the switched-mode power supply chip may further include a power supply module and a power transistor module, the power supply module connected to each of the sampling module, the generation module, the comparison module and the detection module, the power supply module configured to provide a power supply to each of the sampling module, the generation module, the comparison module and the detection module, the power transistor module connected to the output module, the power transistor module configured to cause a power transistor therein to start or stop operation based on the control signal from the output module.

In embodiments of the present invention, there is also provided a switched-mode power supply system including the short-circuit protection circuit as defined in any of the foregoing embodiments of the present invention.

According to the present invention, when an output short circuit is detected, the hiccup-mode duty cycle is adjusted according to the input voltage. Specifically, the hiccup-mode duty cycle is increased when the input voltage is low, thus allowing sufficient energy to be delivered to the output terminal of the SMPS system during the short circuit condition and thus enabling loaded startup. In addition, when the input voltage is high, the hiccup-mode duty cycle is reduced, thereby reducing energy loss during the short circuit condition, which is conducive to operating stability of the system while still allowing loaded startup.

BRIEF DESCRIPTION OF THE DRAWINGS

The above and other advantages of the present invention will become apparent upon reading the following detailed description of specific embodiments thereof in conjunction with the accompanying drawings, in which.

DETAILED DESCRIPTION

The techniques disclosed in embodiments hereof will be described clearly and fully hereunder in conjunction with the appended drawings. Apparently, the embodiments set forth herein are merely some, but not all, of the possible embodiments of this application. Any and all other embodiments devisable by skilled artisans in light of the disclosed embodiments are considered without paying any creative effort are considered to fall within the scope of this application.

It is to be noted that, as used herein, the terms "installation", "connection" and "coupling" should be interpreted in a broad sense, unless otherwise specified and defined. For example, a connection may be a permanent, detachable or integral connection, or a mechanical, electrical or communicative connection, or a direct or indirect connection with one or more intervening media, or an internal communication or interaction between two components. Those of ordinary skill in the art can understand the specific meanings of the above-mentioned terms herein, depending on their context.

Figure 1:
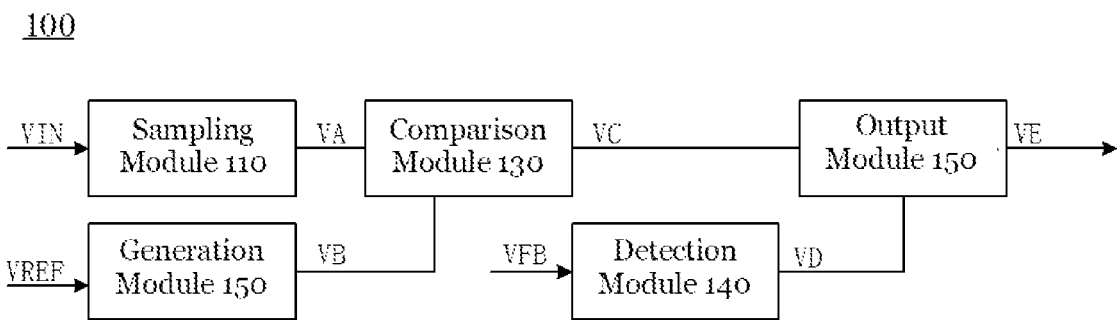
FIG. 1 depicts a structural block diagram of a short-circuit protection circuit according to an embodiment of the present invention.

Referring to FIG. 1, a short-circuit protection circuit 100 for a switched-mode power supply (SMPS) according to a particular embodiment includes a sampling module 110, a generation module 120, a comparison module 130, a detection module 140 and an output module 150. The sampling module 110 samples an input voltage VIN and produces a first voltage VA from the sampled input voltage VIN. The generation module 120 is configured to generate a second voltage VB from a reference voltage VREF. The comparison module 130 is coupled to both the generation module 120 and the sampling module 110 and configured to compare the first voltage VA with the second voltage VB. The detection module 140 is coupled to the output module 150 and an external load circuit and configured to detect whether there is a short circuit in the switched-mode power supply. If there is a short circuit in the switched-mode power supply, the output module 150 outputs a control signal for controlling a power transistor module 160 based on a comparison result from the comparison module 130 (see FIG. 8).

The short-circuit protection circuit 100 in this embodiment overcomes the problems of difficult startup when the input voltage is low and great energy loss when the input voltage is high, seen in conventional SMPS chips with hiccup-mode short-circuit protection. Specifically, when a short circuit event is seen at an output terminal of the SMPS system, a hiccup mode is initiated, in which the system alternately operates for a period of time (active period) and rests for a period of time (inactive period). A hiccup-mode duty cycle is defined as the ratio of the duration of the active period to the total duration of the active and inactive periods. Therefore, a greater hiccup-mode duty cycle means a longer active period and a shorter inactive period. In this embodiment, the input voltage VIN at an input terminal of the SMPS system is detected, and if the input voltage VIN is low, the hiccup-mode duty cycle is increased to prolong the active period of the system. In this way, despite the low input voltage, sufficient energy can still be delivered to the output terminal in every hiccup cycle, thus preventing unsuccessful loaded startup or recovery of normal operation after the short circuit condition is removed. Moreover, if the input voltage VIN is high, the hiccup-mode duty cycle is reduced to shorten the active period and prolong the inactive period of the system. This reduces energy loss during the short circuit condition and increases the SMPS system's operating stability while allowing loaded startup.

Structural and functional details of the various modules will be explained below with reference to FIGS. 2 to 6.

The sampling module 110 includes resistors R1, R2, R3, R4, R5, R6 and an operational amplifier OP1. The resistor R2 receives the input voltage VIN at one end and is coupled to one end of the resistor R1 at the other end. The other end of the resistor R1 is grounded. One end of the resistor R4 is coupled to both the resistors R2 and R1, and the other end of the resistor R4 is coupled to both one end of the resistor R3 and a first input terminal of the operational amplifier OP1. The other end of the resistor R3 receives the reference voltage VREF. A second input terminal of the operational amplifier OP1 is coupled to both one end of the resistor R5 and one end of the resistor R6. The other end of the resistor R5 is grounded, and the other end of the resistor R6 is coupled to an output terminal of the operational amplifier OP1. The first voltage VA is output from the output terminal of the operational amplifier OP1. A first power terminal of the operational amplifier OP1 is coupled to a power supply voltage VDD. A second power terminal of the operational amplifier OP1 is grounded.

Figure 2:
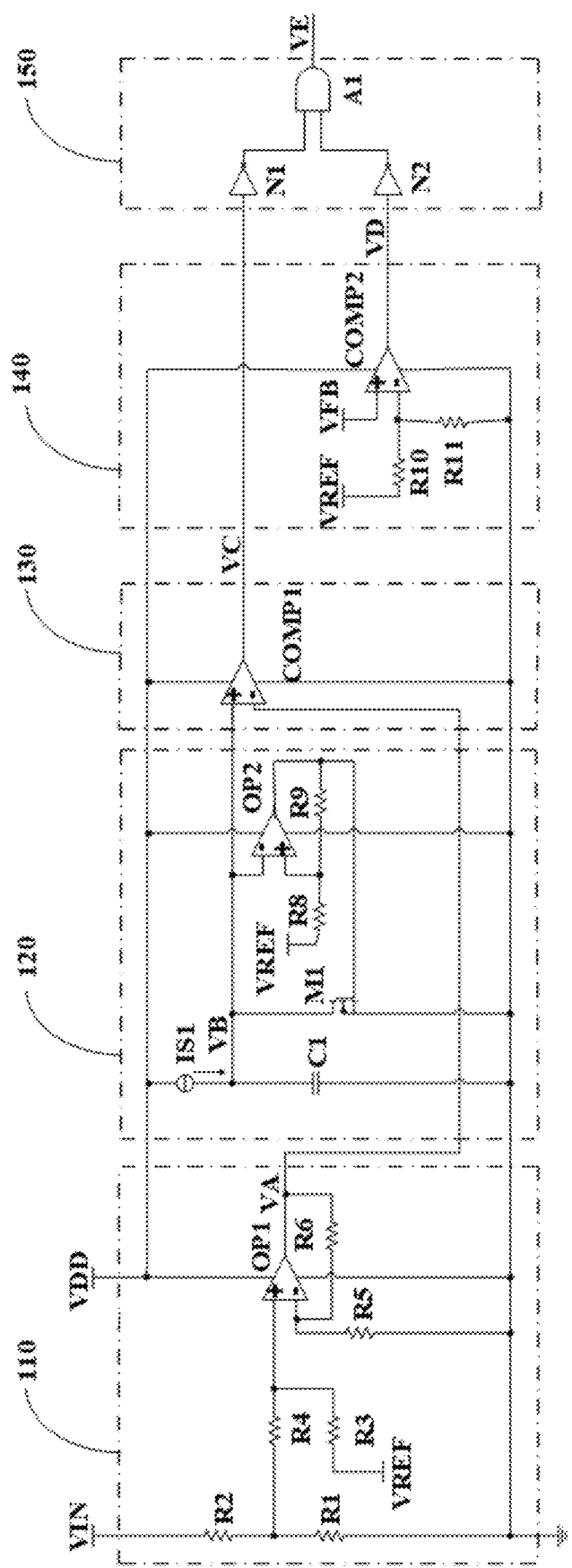
FIG. 2 schematically illustrates how various components are coupled in the short-circuit protection circuit of FIG. 1.
Figure 3:
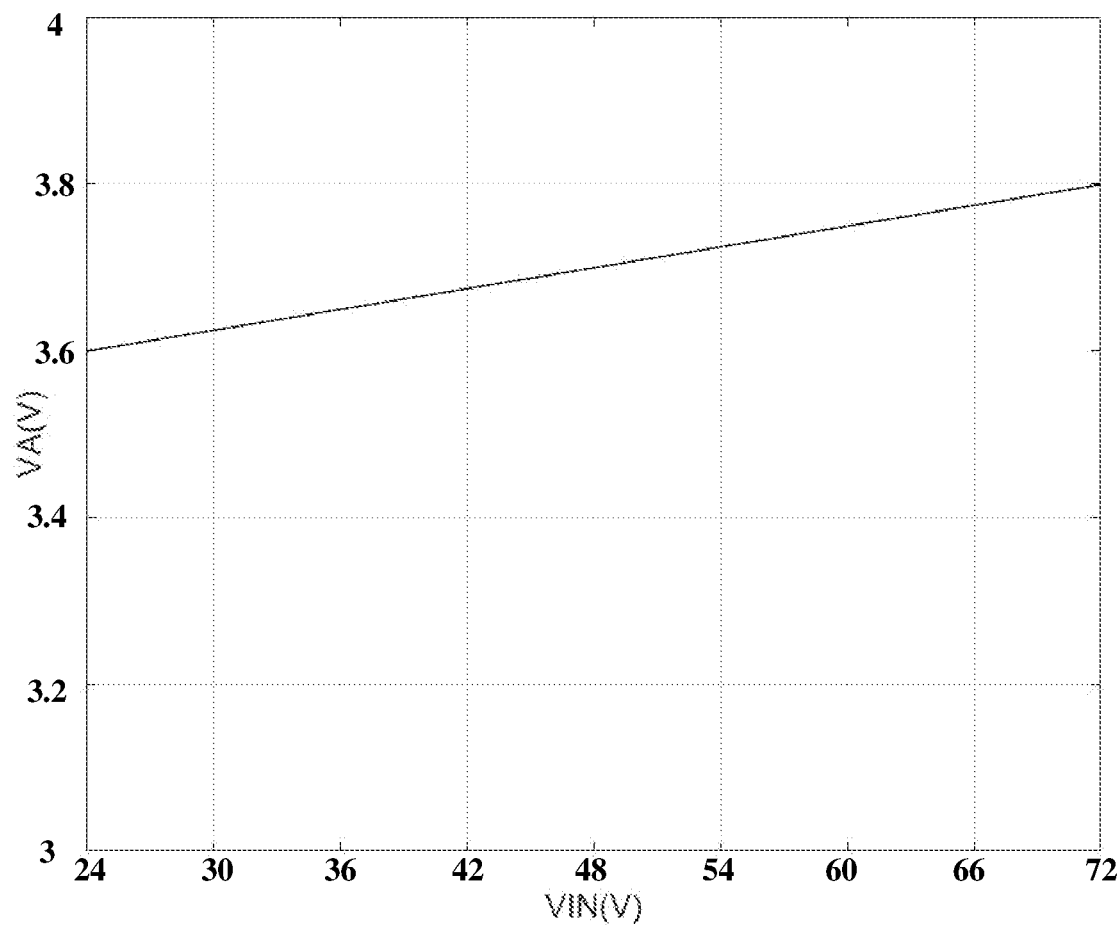
FIG. 3 schematically illustrates a relationship between an input voltage VIN sampled by a sampling module in the short-circuit protection circuit of FIG. 2 and a first voltage VA produced therefrom.

The sampling module 110 is configured to sample the input voltage VIN, proportionally attenuate it and shift its level. As shown in FIG. 2, the reference voltage VREF provides circuitry of the SMPS chip with a high-precision reference voltage. The resistors R1 to R6 are appropriately configured so that the first voltage VA varies, for example, between 3.6 V and 3.8 V, with the variation of the input voltage VIN, e.g., between 24 V and 72 V, as shown in FIG. 3. In particularly, the first voltage VA may be given by Eqn. 1 below:

$$VA = \left(1 + \frac{R6}{R5}\right)\left(\frac{R1*R3*VIN}{(R1+R2)\left(\frac{R1*R2}{R1+R2} + R3 + R4\right)} + \frac{VREF\left(\frac{R1*R2}{R1+R2} + R4\right)}{\frac{R1*R2}{R1+R2} + R3 + R4}\right) \quad (1)$$

It should be noted that the reference voltage VREF is mandatory. In absence of the reference voltage VREF, the first voltage VA will proportionally vary within a low range around 0 V and has to be re-amplified before it can be identified by the comparison module 130. With such re-amplification, the amplitude of the first voltage VA will be too small to enable the comparison module 130 to output a proper hiccup-mode duty cycle signal. FIG. 3 shows the variation of the first voltage VA with the input voltage VIN. In particular, the first voltage VA may vary linearly with the input voltage VIN. Thus, the variation of the first voltage VA can reflect the variation of the input voltage VIN. That is, the higher the first voltage VA, the higher the input voltage VIN; and vice versa.

The generation module 120 includes a current source IS1, a capacitor C1, a field-effect transistor M1, resistors R8 and R9 and an operational amplifier OP2. One end of the current source IS1 is coupled to the power supply voltage VDD, and the other end thereof is coupled to both one end of the capacitor C1 and a drain of the field-effect transistor M1. The other end of the capacitor C1 is grounded. A first input terminal of the operational amplifier OP2 is coupled to the drain of the field-effect transistor M1, and a second input terminal of the operational amplifier OP2 is coupled to both one end of the resistor R8 and one end of the resistor R9. The first input terminal of the operational amplifier OP2 receives the second voltage VB. The other end of the resistor R8 receives the reference voltage VREF. The other end of the resistor R9 is coupled to both an output terminal of the operational amplifier OP2 and a gate of the field-effect transistor M1. A source of the field-effect transistor M1 is grounded. A first power terminal of the operational amplifier OP2 is coupled to the power supply voltage VDD. A second power terminal of the operational amplifier OP2 is grounded.

Figure 4:
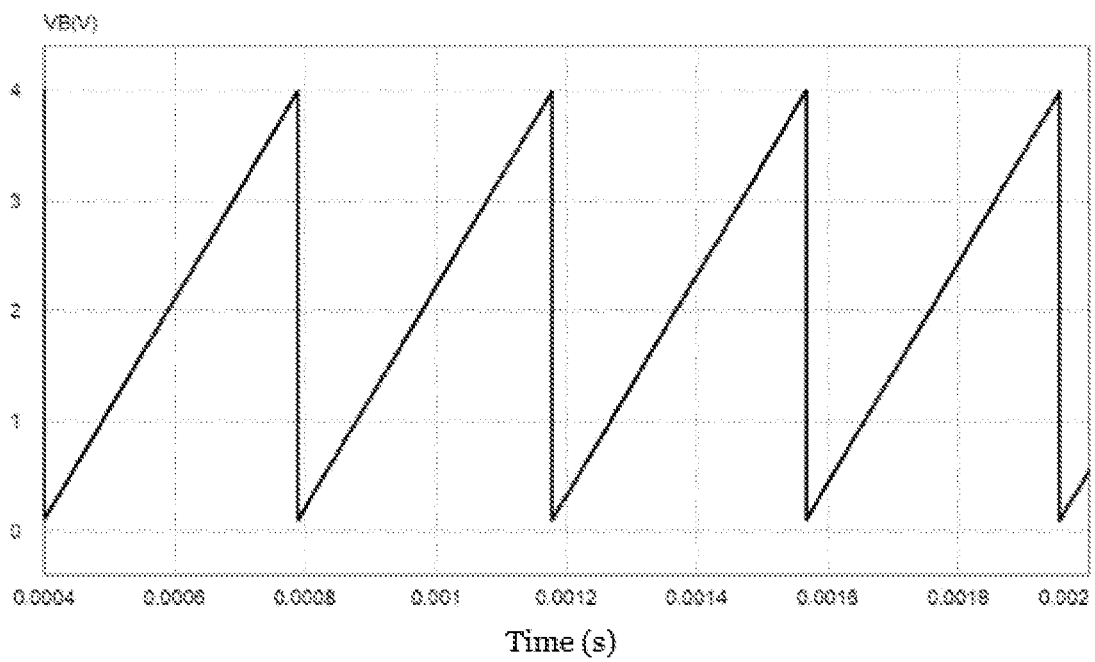
FIG. 4 shows a waveform of a second voltage VB generated by a generation module in the short-circuit protection circuit of FIG. 2.

The generation module 120 generates the second voltage VB from the reference voltage VREF. The second voltage VB has a sawtooth waveform and a predetermined period T, as shown in FIG. 4. Referring again to FIG. 2, the operational amplifier OP2 in the generation module 120 is a rail-to-rail operational amplifier outputting a level ranging from as low as 0 V to as high as the power supply voltage VDD. Therefore, peak VB1 and valley VB2 values of the sawtooth waveform VB (second voltage VB) generated by the generation module 120 can be calculated according to Eqns. 2 and 3 below, respectively.

$$VB1 = \frac{VDD*R8}{R9+R8} + \frac{VREF*R9}{R9+R8} \quad (2)$$

$$VB2 = \frac{VREF*R9}{R9+R8} \quad (3)$$

Moreover, since the field-effect transistor M1 and the capacitor C1 make up a discharge circuit having a very small resistance, the discharging time of the capacitor C1 is negligible when compared to its charging time. Accordingly, a frequency f of the sawtooth waveform of the second voltage VB is given by Eqn. 4 below:

$$f = \frac{IS}{C*(VB1-VB2)} \quad (4)$$

In this equation, IS represents a value of a current from the current source IS1, C denotes a capacitance of the capacitor C1, and VB1 and VB2 are the peak value VB1 and valley value VB2 of the sawtooth waveform VB generated by the generation module 120, respectively. Further, the predetermined period T can be obtained as the reciprocal of the frequency f.

The comparison module 130 includes a comparator COMP1. A first input terminal of the comparator COMP1 is coupled to the first input terminal of the operational amplifier OP2 in the generation module 120, and a second input terminal of the comparator COMP1 is coupled to the output terminal of the operational amplifier OP1 in the sampling module 110. A first power terminal of the comparator COMP1 is coupled to the power supply voltage VDD, and a second power terminal of the comparator COMP1 is grounded. A third voltage VC is output from an output terminal of the comparator COMP1.

The comparison module 130 is coupled to both the generation module 120 and the sampling module 110 and configured to compare the first voltage VA with the second voltage VB. Specifically, if the second voltage VB is higher than the first voltage VA, the third voltage VC output from the comparison module 130 is high. If the second voltage VB is lower than the first voltage VA, the third voltage VC is low. If the second voltage VB is equal to the first voltage VA, a critical condition can be identified, but is negligible. The comparison module 130 is configured to compare levels of the second voltage VB and the first voltage VA and thereby produce a rectangular waveform VC (i.e., the third voltage) with a variable hiccup-mode duty cycle D determined by Eqn. 5 below:

$$D = \frac{VB1-VA}{VB1-VB2} \quad (5)$$

Figure 5A:
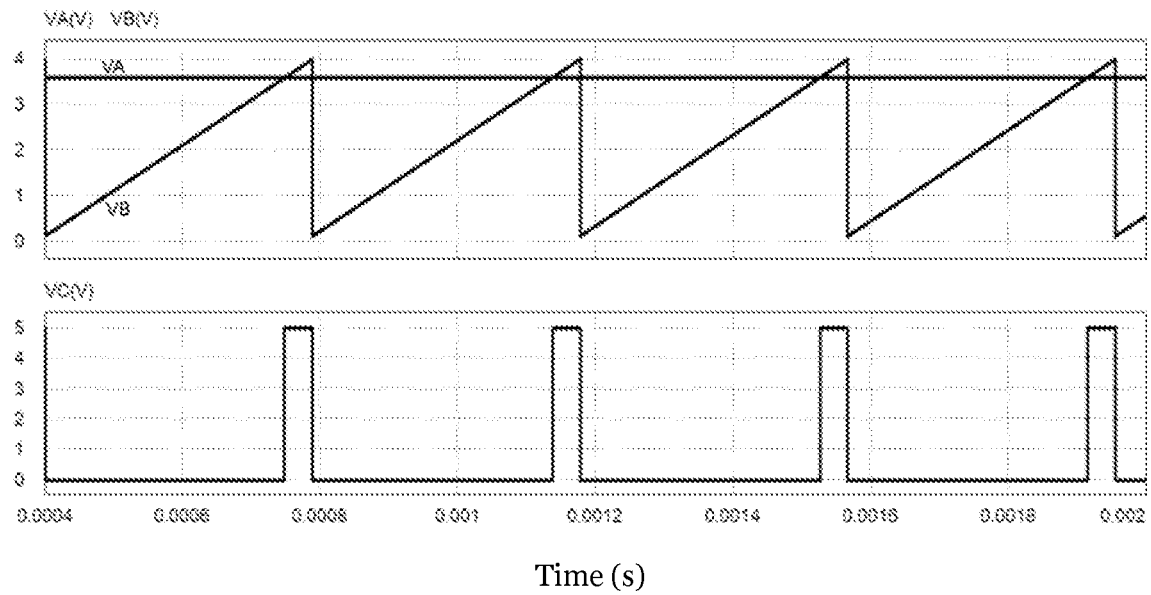
FIG. 5A shows a relationship among the first voltage VA, the second voltage VB and a third voltage VC output from a comparison module in the short-circuit protection circuit of FIG. 2.
Figure 5B:
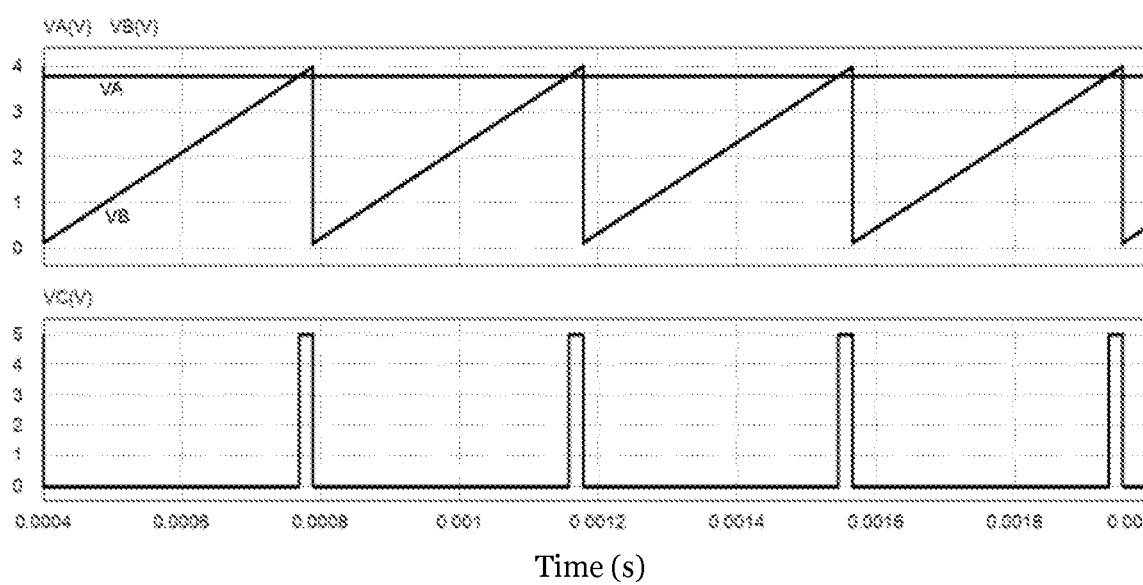
FIG. 5B shows another relationship among the first voltage VA, the second voltage VB and the third voltage VC output from the comparison module in the short-circuit protection circuit of FIG. 2.
Figure 6:
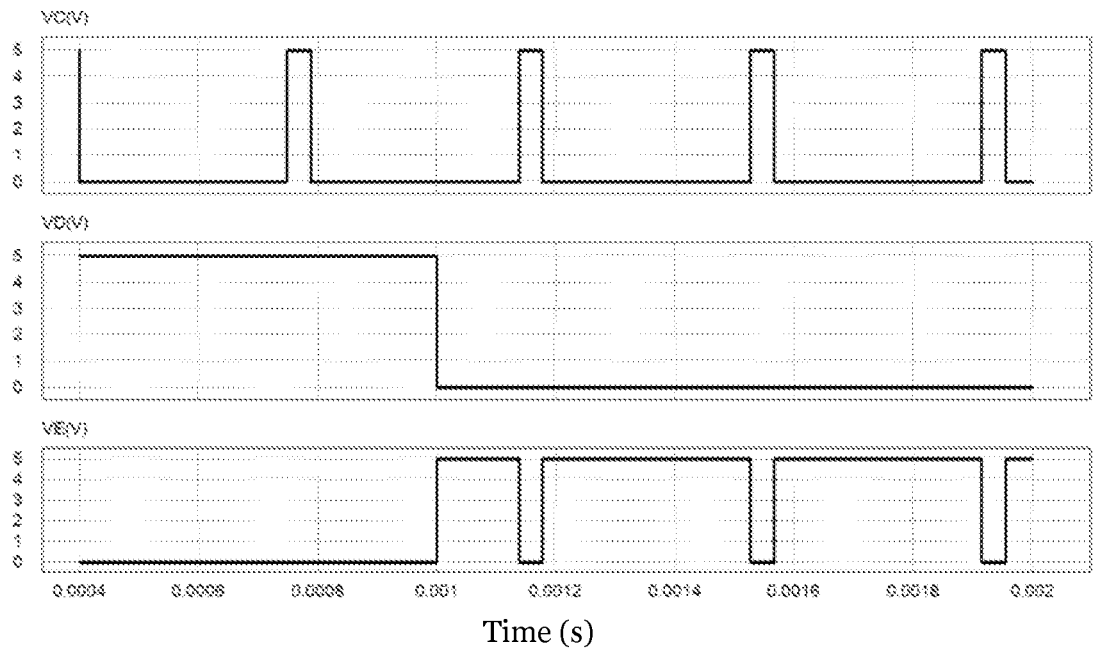
FIG. 6 shows a relationship among the third voltage VC, a fourth voltage VD output from a detection module and a control signal VE output from an output module in the short-circuit protection circuit of FIG. 2.

Specifically, if the first voltage VA is higher than the peak value VB1 of the second voltage VB, then the hiccup-mode duty cycle D of the rectangular waveform VC may be set to 0 (it is reasonable because VA is always lower than VB1). If the first voltage VA is lower than the valley value VB2 of the second voltage VB, the duty cycle may be set to 1 (it is also reasonable because VA is always higher than VB2). As can be seen from Eqn. 5, the lower the first voltage VA, the greater the hiccup-mode duty cycle D; and the higher the first voltage VA, the smaller the hiccup-mode duty cycle D. Since the first voltage VA varies linearly with the input voltage VIN (as shown in FIG. 3), it would be appreciated that the lower the input voltage VIN, the greater the hiccup-mode duty cycle D, the longer the SMPS chip is active in every hiccup cycle (i.e., the predetermined period T), and the greater the number of times the power transistor in the SMPS chip is switched on and off. On the contrary, the higher the input voltage VIN, the smaller the hiccup-mode duty cycle D, the shorter the SMPS chip is active in every hiccup cycle, and the fewer the number of times the power transistor in the SMPS chip is switched on and off. Rectangular waveforms VC with different duty cycles output in response to different first voltages VA (i.e., different input voltages VIN) are shown in FIGS. 5A and 5B. The first voltage VA in FIG. 5A is lower than that in FIG. 5B. It would be appreciated that the hiccup-mode duty cycle D in FIG. 5A is greater than that in FIG. 5B, meaning that the SMPS chip is active for a longer time at the lower input voltage than at the higher input voltage (i.e., VC is high for a longer time in FIG. 5A than in FIG. 5B).

The detection module 140 includes a comparator COMP2, a resistor R10 and a resistor R11. A first input terminal of the comparator COMP2 is coupled to an external feedback circuit for detecting whether there is a short circuit at the output terminal outside the SMPS system. A second input terminal of the comparator COMP2 is coupled to both one end of the resistor R10 and one end of the resistor R11. The other end of the resistor R10 receives the reference voltage VREF, and the other end of the resistor R11 is grounded. A first power terminal of the comparator COMP2 is coupled to the power supply voltage VDD. A second power terminal of the comparator COMP2 is grounded. A fourth voltage VD is output from an output terminal of the comparator COMP2.

The detection module 140 is configured to detect whether there is a short circuit at the output terminal. The input voltage VFB is a voltage at a feedback pin and is equal to VREF during normal operation. When there is a short circuit, or immediately after startup, the input voltage VFB is typically very low, and if it is lower than a predetermined value, then it can be considered that a short circuit has occurred. In this embodiment, as shown in FIG. 2, if VFB<VREF*R11/(R11+R10), when an output short circuit can be expected. When a short circuit takes place at the output terminal of the SMPS system, the fourth voltage VD from the detection module 140 is low. When the SMPS system is operating normally, the fourth voltage VD is high.

The output module 150 includes inverters N1 and N2 and an AND gate A1. An input terminal of the inverter N1 is coupled to the output terminal of the comparator COMP1 in the comparison module 130. An input terminal of the inverter N2 is coupled to the output terminal of the comparator COMP2 in the detection module 140. An output terminal of the inverter N1 is coupled to a first input terminal of the AND gate A1, and an output terminal of the inverter N2 is coupled to a second input terminal of the AND gate A1. A control signal VE is output from an output terminal of the AND gate A1 to the power transistor module 160 (see FIG. 8).

In this embodiment, only when there is a short circuit at the output terminal of the SMPS system, i.e., when the fourth voltage VD from the detection module 140 is low, the output module 150 will produce from the comparison result from the comparison module 130 and output the control signal VE for controlling the power transistor module 160. Specifically, when the third voltage VC output from the comparison module 130 and the fourth voltage VD from the detection module 140 are both low, the control signal VE is high. When the third voltage VC is high and the fourth voltage VD is low, the control signal VE is low, as specifically shown in FIG. 6. When the control signal VE is pulled high, the power transistor module 160 in the SMPS chip will turn off the power transistor. When the control signal VE is pulled low, the power transistor module 160 starts operating normally. That is, the power transistor in the power transistor module 160 starts operating normally to periodically and alternately switch on and off.

Further, it would be appreciated that when there is no short circuit at the output terminal of the SMPS system, i.e., when the fourth voltage VD output from the detection module 140 is high, no matter whether the third voltage VC output from the comparison module 130 is high or low, the control signal VE from the output module 150 remains low, keeping the power transistor module 160 operating normally to periodically and alternately switch on and off.

According to embodiments of the present invention, when a short circuit is detected at the output terminal of the SMPS system (i.e., when the fourth voltage VD is low), the duration when the third voltage VC from the comparison module 130 is high (and hence the hiccup-mode duty cycle D) and hence the duration when the power transistor in the power transistor module 160 operates normally can be adjusted according to the input voltage VIN, thereby controlling energy delivered from the power transistor. During the normal operation of the power transistor in the SMPS chip, it operates as if it is in a normal mode, i.e., periodically and alternately switch on and off.

Figure 7:
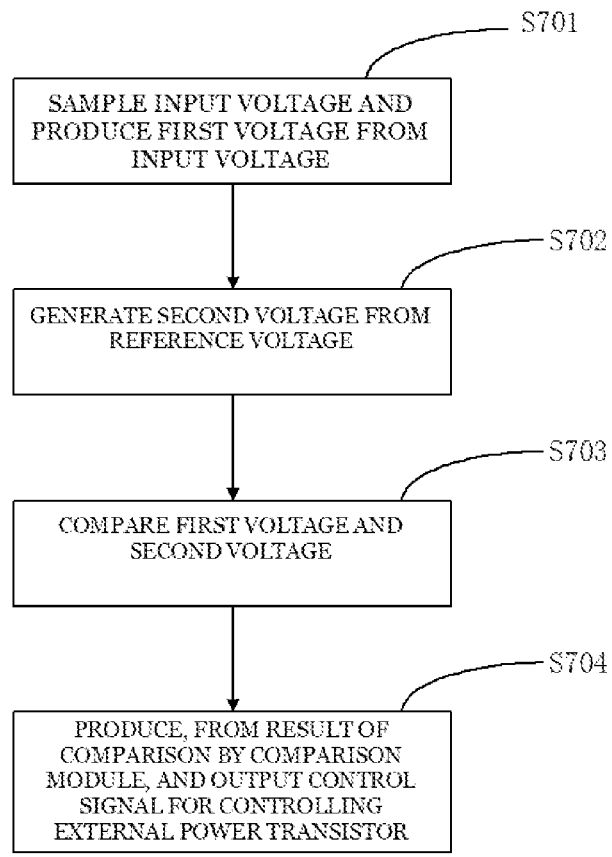
FIG. 7 is a flowchart of a short-circuit protection method for the short-circuit protection circuit of FIG. 2.

FIG. 7 shows a flowchart of a short-circuit protection method for use with the short-circuit protection circuit of FIG. 2. When a short circuit is detected in the switched-mode power supply, i.e., when the fourth voltage VD from the detection module 140 is detected to be low, the following steps are carried out in the short-circuit protection method.

Step S701: Sample an input voltage and produce a first voltage from the input voltage.

Step S702: Generate a second voltage from a reference voltage. The second voltage has a predetermined period and a sawtooth waveform.

Step S703: Compare the first voltage with the second voltage.

Step S704: Control an external power transistor using a control signal produced from a comparison output from the comparison module.

Figure 8:
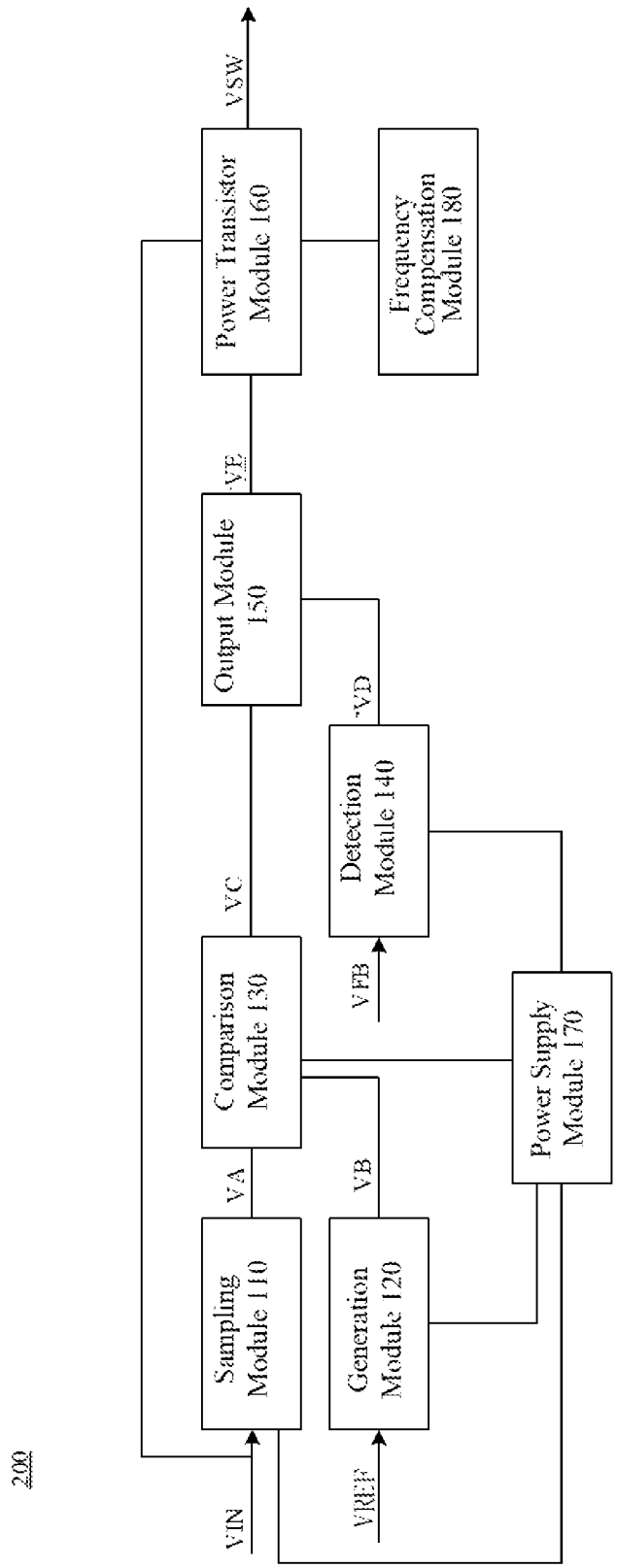
FIG. 8 is a structural block diagram of an SMPS chip incorporating the short-circuit protection circuit of FIG. 2.
Figure 9:
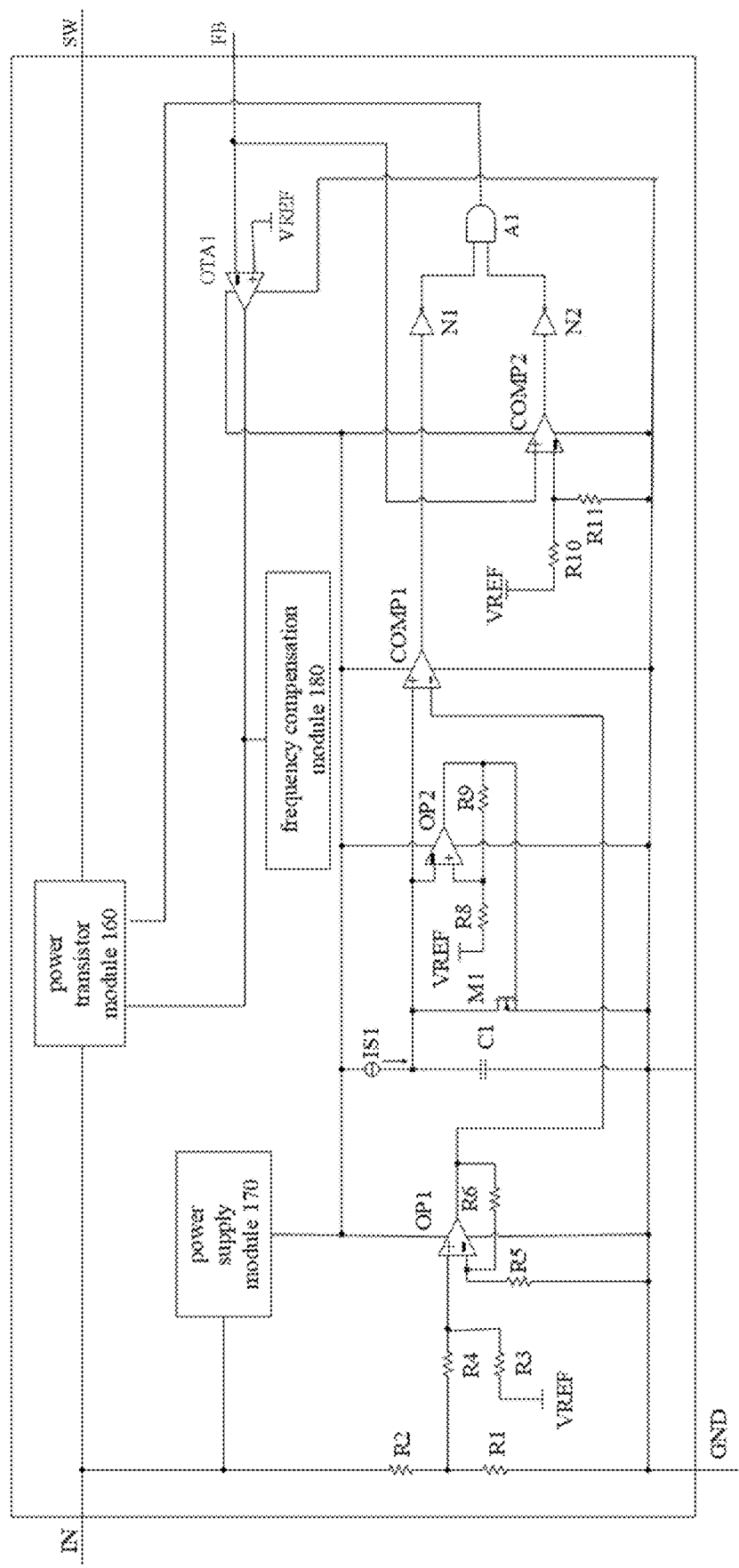
FIG. 9 schematically illustrates how various components are coupled in the SMPS chip incorporating the short-circuit protection circuit of FIG. 2.

FIG. 8 is a structural block diagram of an SMPS chip 200 incorporating the short-circuit protection circuit 100 of FIG. 2. FIG. 9 schematically illustrates how various components are coupled in the SMPS chip 200 incorporating the short-circuit protection circuit 100 of FIG. 2. As shown in FIGS. 8 and 9, the SMPS chip 200 further includes a power supply module 170 and a power transistor module 160. The power supply module 170 is coupled to each of the sampling module 110, the generation module 120, the comparison module 130 and the detection module 140 and is configured to provide the voltage VDD. The power transistor module 160 is coupled to the output module 150 and is configured to cause the power transistor in the power transistor module 160 to start or stop operation based on the control signal from the output module 150. The SMPS chip 200 further includes a frequency compensation module 180, which is coupled to the power transistor module 160 and configured to stabilize the control loop of the power supply chip.

The SMPS chip 200 shown in FIGS. 8 and 9 is capable of hiccup-mode short-circuit protection with a large hiccup-mode duty cycle in response to a low input voltage and with a small hiccup-mode duty cycle in response to a high input voltage. A large hiccup-mode duty cycle in response to a low input voltage provides the advantage that the power transistor in the SMPS chip is switched on for a greater number of times during the shirt circuit condition, thus delivering sufficient total energy in spite of the low input voltage, which effectively overcomes the problem of difficult loaded startup at a low input voltage seen in conventional hiccup-mode short-circuit protection circuits. That is, not only loaded startup at a low input voltage is allowed, but the output voltage can also automatically recover after the short circuit condition is removed, even when a load is coupled to the output terminal. Additionally, a small hiccup-mode duty cycle in response to a high input voltage provides the advantage that the power transistor in the SMPS chip is switched on for fewer times during the shirt circuit condition, thus delivering less total energy in spite of the high input voltage, when compared to conventional hiccup-mode short-circuit protection circuits. In this way, not only reduced loss is achievable, but the output voltage can also automatically recover after the short circuit condition is removed, even when a load is coupled to the output terminal.

Figure 10:
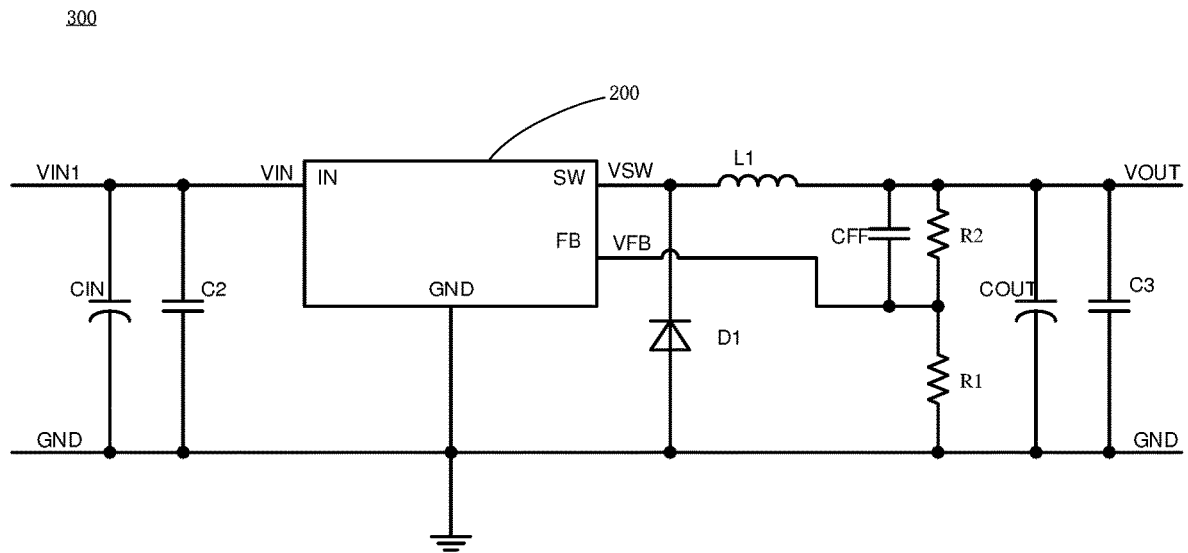
FIG. 10 schematically illustrates how various components are coupled in the SMPS system incorporating the SMPS chip of FIG. 8.

FIG. 10 schematically illustrates how various components are coupled in an SMPS system 300 incorporating the SMPS chip 200 of FIG. 8. A first pin IN on the SMPS chip 200 is coupled to the input terminal VIN1. One end of a capacitor CIN and one end of a capacitor C2 are both coupled to the input terminal VIN1, and the other ends of them are both grounded GND. A second pin FB on the SMPS chip 200 is coupled to one end of each of a capacitor CFF and the resistors R2 and R1. The other end of the resistor R1 is grounded GND, and the other ends of the capacitor CFF and the resistor R2 are each coupled to both one end of an inductor L1 and the output terminal VOUT. The other end of the inductor L1 is coupled to both a third pin SW on the SMPS chip 200 and a cathode of a diode D1, and an anode of the diode D1 is grounded. Each of capacitors COUT and C3 is coupled to the output terminal VOUT at one end and grounded GND at the other end. The first pin IN is configured to provide the input voltage VIN to the SMPS chip 200. The second pin FB is configured to receive a feedback voltage VFB for stabilizing the output voltage at the output terminal VOUT and to detect whether there is a short circuit in the SMPS system 300. The third pin SW is configured to output a voltage VSW for powering an external load.

Figure 11A:
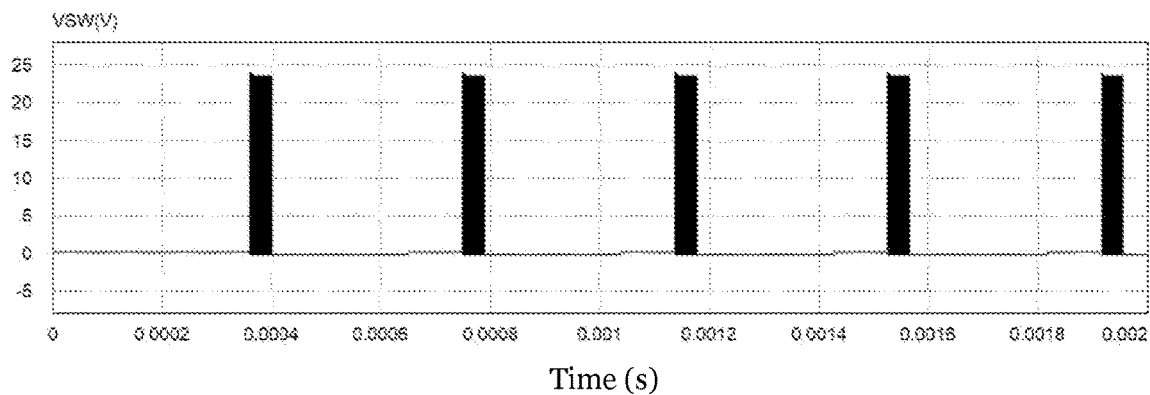
FIG. 11A shows an output voltage waveform VSW of the SMPS chip in the SMPS system of FIG. 10 during hiccup-mode short-circuit protection.
Figure 11B:
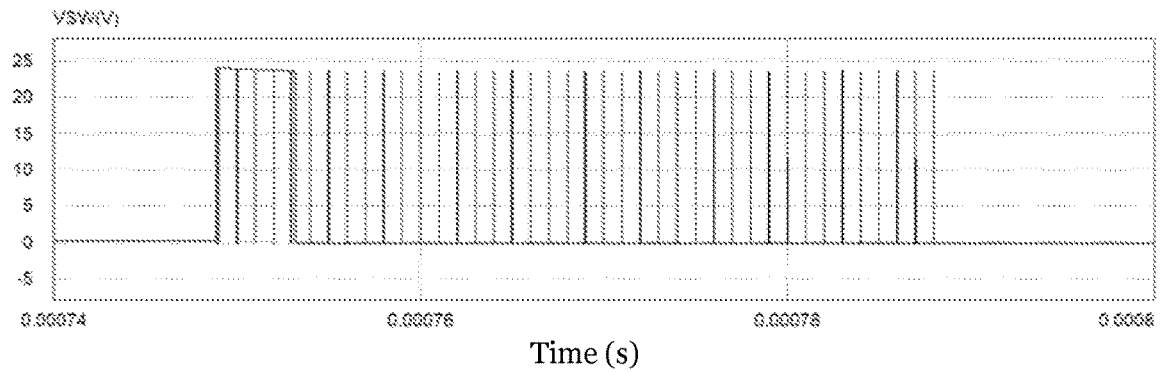
FIG. 11B shows an enlarged partial view of the output voltage waveform VSW of the SMPS chip in the SMPS system of FIG. 11A during hiccup-mode short-circuit protection.
Figure 12A:
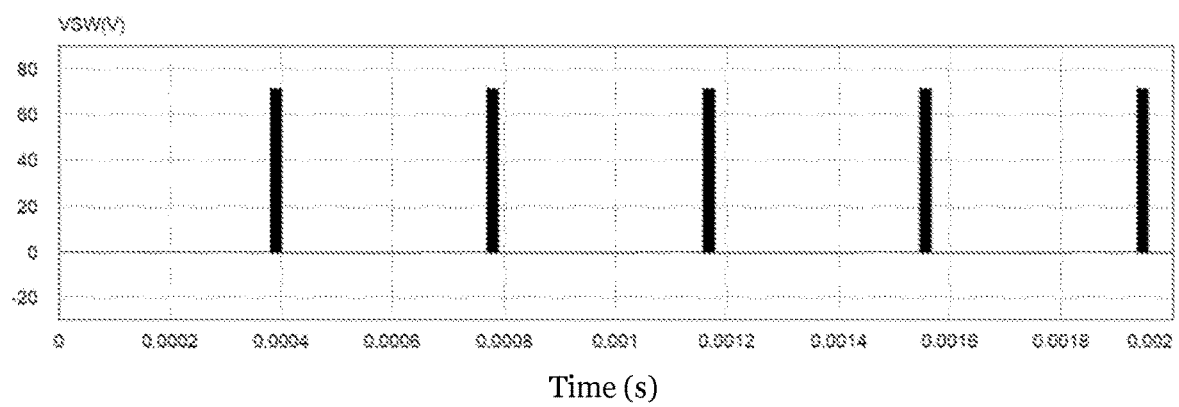
FIG. 12A shows another output voltage waveform VSW of the SMPS chip in the SMPS system of FIG. 10 during hiccup-mode short-circuit protection.
Figure 12B:
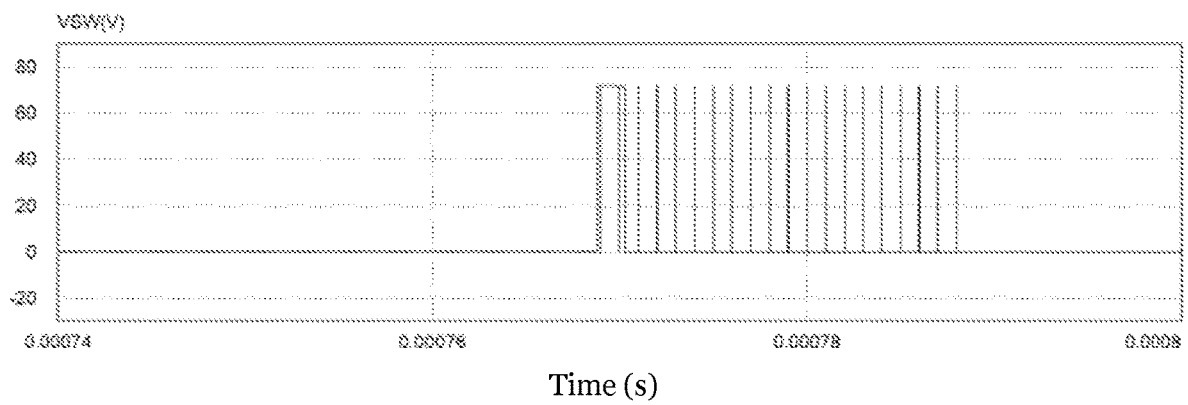
FIG. 12B shows an enlarged partial view of the output voltage waveform VSW of the SMPS chip in the SMPS system of FIG. 12A during hiccup-mode short-circuit protection.

Specifically, FIGS. 11A, 11B 12A and 12B show output voltage waveforms VSW of the SMPS chip 200 at different input voltages VIN in the event of a short circuit in the load. Specifically, FIG. 11A shows an output voltage waveform VSW at an input voltage VIN of 24 V. FIG. 12A shows an output voltage waveform VSW at an input voltage VIN of 72 V. FIG. 11B is an enlarged partial view of the output voltage waveform VSW at the input voltage VIN of 24 V. FIG. 12B is an enlarged partial view of the output voltage waveform VSW at the input voltage VIN of 72 V. As can be seen from FIGS. 11A to 12B, in the event of a short circuit or startup, within the same time frame (e.g., from 0.00074 s to 0.0008 s), the power transistor operates for a longer time at a low input voltage (e.g., 24 V) than at a high input voltage (e.g., 72 V) (i.e., in the event of a short circuit or startup, within the same time frame, the power transistor is switched for more times at a low input voltage than at a high input voltage). This makes heavily loaded startup at a low voltage easier.

The short-circuit protection circuit, chip and system for a switched-mode power supply provided in embodiments of the present invention are able to adjust the hiccup-mode duty cycle according to the input voltage, thus overcoming the problem of difficult loaded startup or automatic output recovery after a short circuit is removed when the input voltage is low and the problem of significant loss during a short circuit condition when the input voltage is high, both seen in the conventional hiccup-mode short-circuit protection approach. Specifically, the hiccup-mode duty cycle is increased when the input voltage is low, thereby enabling sufficient energy to be delivered to the output terminal of the SMPS system during the short circuit condition and allowing loaded startup. Moreover, the hiccup-mode duty cycle is reduced when the input voltage is high, thus reducing energy loss during the short circuit condition, which is conducive to the operating stability of the system while still allowing loaded startup.

In the above, each embodiment is described with individual emphasis, and for details of any feature that is not detailed in a certain embodiment, reference can be made to the description of any other embodiment with such details.

The short-circuit protection circuit, chip and system for a switched-mode power supply provided in embodiments of the present invention have been described in detail by way of specific examples that demonstrate the principles and embodiments of this invention and these embodiments are presented for the sole purpose of facilitating an understanding of the technical essence and concept of this application. It is to be understood by those of ordinary skill in the art that although they may make various modifications to the disclosed embodiments or substitute some or all features thereof with equivalents, all such modifications and equivalent substitutions are not considered to deviate the technical essence of the respective newly obtained embodiments from the scope of the embodiments of this application.

What is claimed is:

1. A short-circuit protection circuit for a switched-mode power supply, the short-circuit protection circuit comprising:
   a sampling module configured for sampling an input voltage and producing a first voltage from the input voltage;
   a generation module configured for generating a second voltage from a reference voltage, the second voltage having a predetermined period and a sawtooth waveform;
   a comparison module configured for comparing the first voltage and the second voltage; and
   an output module configured for outputting, from a result of the comparison performed by the comparison module, a control signal for controlling an external power transistor in the event of a short circuit in the switched-mode power supply, wherein:
   the result of the comparison comprises a first comparison result indicating that the first voltage is higher than the second voltage during a first time interval within the predetermined period, the output module outputs, from the first comparison result, a first control signal for causing the external power transistor to be out of operation within the first time interval;
   the result of the comparison further comprises a second comparison result indicating that the first voltage is lower than the second voltage during a second time interval within the predetermined period, the output module outputs, from the second comparison result, a second control signal for causing the external power transistor to operate within the second time interval, wherein the predetermined period consists of the first time interval and the second time interval; and
   a duration of the second time interval decreases with increase of the first voltage, wherein a hiccup-mode duty cycle decreases with increase of the first voltage and increases with decrease of the first voltage.

2. The short-circuit protection circuit for a switched-mode power supply of claim 1, wherein the first voltage varies linearly with the input voltage.

3. The short-circuit protection circuit for a switched-mode power supply of claim 1, further comprising a detection module connected to the output module, the detection module configured to detect whether there is a short circuit in the switched-mode power supply, wherein in the event the occurrence of a short circuit, the detection module outputs a low-level signal, and if there is no short circuit, the detection module outputs a high-level signal.

4. The short-circuit protection circuit for a switched-mode power supply of claim 3, wherein when the first voltage is higher than the second voltage, the comparison module outputs a low-level signal, and when the first voltage is lower than the second voltage, the comparison module outputs a high-level signal.

5. The short-circuit protection circuit for a switched-mode power supply of claim 4, wherein when the comparison module outputs a low-level signal and the detection module outputs a low-level signal, the output module outputs a high-level signal for causing the external power transistor to be out of operation, and when the comparison module outputs a high-level signal and the detection module outputs a low-level signal, the output module outputs a low-level signal for causing the external power transistor to operate.

6. The short-circuit protection circuit for a switched-mode power supply of claim 1, wherein the sampling module comprises a first resistor, a second resistor, a third resistor, a fourth resistor, a fifth resistor, a sixth resistor and a first operational amplifier, one end of the second resistor receiving the input voltage, the other end of the second resistor connected to one end of the first resistor, the other end of the first resistor grounded, one end of the fourth resistor connected to both the second resistor and the first resistor, the other end of the fourth resistor connected to both one end of the third resistor and a first input terminal of the first operational amplifier, the other end of the third resistor receiving the reference voltage, the first operational amplifier having a second input terminal connected to both one end of the fifth resistor and one end of the sixth resistor, the other end of the fifth resistor grounded, the other end of the sixth resistor connected to an output terminal of the first operational amplifier, the output terminal of the first operational amplifier outputting the first voltage.

7. The short-circuit protection circuit for a switched-mode power supply of claim 1, wherein the generation module comprises a current source, a capacitor, a field-effect transistor, a seventh resistor, an eighth resistor and a second operational amplifier, one end of the current source connected to a power supply voltage, the other end of the current source connected to both one end of the capacitor and a drain of the field-effect transistor, the other end of the capacitor grounded, the second operational amplifier having a first input terminal connected to the drain of the field-effect transistor, the second operational amplifier having a second input terminal connected to both one end of the seventh resistor and one end of the eighth resistor, the second operational amplifier having a first input terminal receiving the second voltage, the other end of the seventh resistor receiving the reference voltage, the other end of the eighth resistor connected to both an output terminal of the second operational amplifier and a gate of the field-effect transistor, a source of the field-effect transistor grounded.

8. The short-circuit protection circuit for a switched-mode power supply of claim 1, wherein the output module comprises a first inverter, a second inverter, and an AND gate, the first inverter having an output terminal connected to a first input terminal of the AND gate, the second inverter having an output terminal connected to a second input terminal of the AND gate, the AND gate having an output terminal from which the control signal is output to the external power transistor.

9. A short-circuit protection method for a switched-mode power supply, comprising:
   sampling an input voltage and producing a first voltage from the input voltage;
   generating a second voltage from a reference voltage, the second voltage having a predetermined period and a sawtooth waveform;
   comparing the first voltage and the second voltage; and
   outputting, from a result of the comparison of the first voltage and the second voltage, a control signal for controlling an external power transistor in the event of a short circuit in the switched-mode power supply, wherein:
   the result of the comparison comprises a first comparison result indicating that the first voltage is higher than the second voltage during a first time interval within the predetermined period, the output module outputs, from the first comparison result, a first control signal for causing the external power transistor to be out of operation within the first time interval;
   the result of the comparison further comprises a second comparison result indicating that the first voltage is lower than the second voltage during a second time interval within the predetermined period, the output module outputs, from the second comparison result, a second control signal for causing the external power transistor to operate within the second time interval, wherein the predetermined period consists of the first time interval and the second time interval; and
   a duration of the second time interval decreases with increase of the first voltage.

10. A switched-mode power supply chip comprising the short-circuit protection circuit of claim 1.

11. The switched-mode power supply chip of claim 10, further comprising a power supply module and a power transistor module,
   the power supply module connected to each of the sampling module, the generation module, the comparison module and the detection module, the power supply module configured to provide a power supply to each of the sampling module, the generation module, the comparison module and the detection module,
   the power transistor module connected to the output module, the power transistor module configured to cause a power transistor therein to start or stop operation based on the control signal from the output module.

12. A switched-mode power supply system comprising the short-circuit protection circuit of claim 1.

* * * * *